Figure 1:
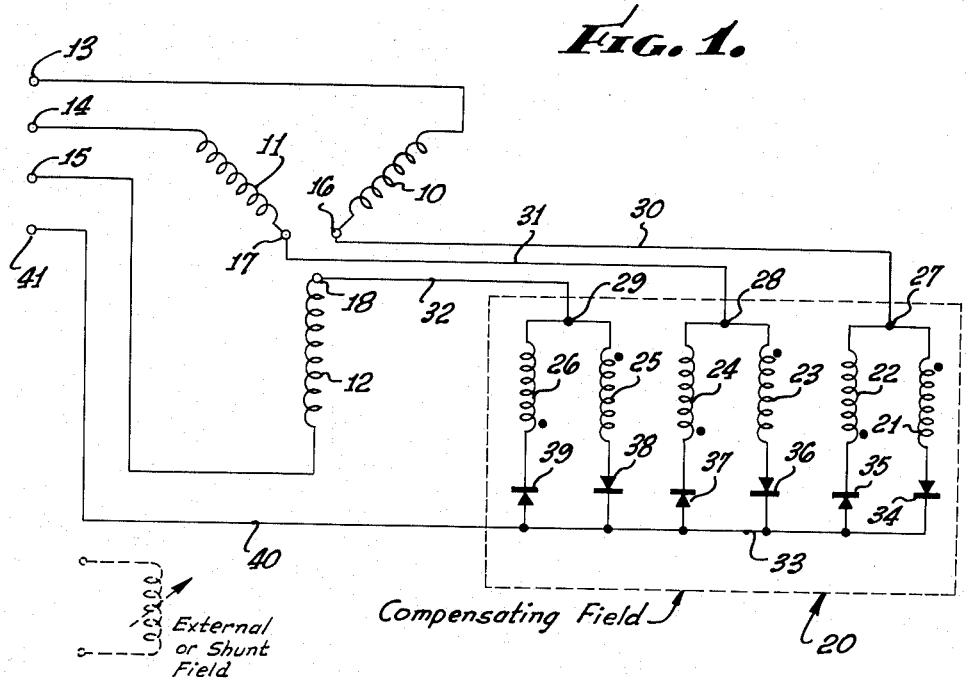

Sept. 7, 1965

H. M. ROBINSON 3,205,429

ALTERNATOR WITH SERIES FIELD

Filed Nov. 14, 1960

2 Sheets-Sheet 1

INVENTOR.
HORACE M. ROBINSON
BY
Flam and Flam
ATTORNEYS.

Sept. 7, 1965 H. M. ROBINSON 3,205,429
ALTERNATOR WITH SERIES FIELD
Filed Nov. 14, 1960 2 Sheets-Sheet 2

INVENTOR.
HORACE M. ROBINSON
BY
Flam and Flam
ATTORNEYS.

United States Patent Office 3,205,429
Patented Sept. 7, 1965

3,205,429
ALTERNATOR WITH SERIES FIELD
Horace M. Robinson, 3927 Collis Ave.,
Los Angeles, Calif.
Filed Nov. 14, 1960, Ser. No. 68,836
13 Claims. (Cl. 322—28)

This invention relates to an alternator, and particularly to a method of field excitation to improve voltage regulation.

Voltage output of alternators is conveniently controlled by varying the field excitation. The usual voltage regulator senses a change in output voltage, and by the aid of suitable networks, alters the field excitation to restore the voltage to a value near its rating. If the load suddenly increases, the output voltage may drop quite far before correction is achieved. The voltage regulator responds not to change in load, but to change in voltage—and thus a time delay is involved. A remedy for this situation exists by having a field serially associated with the output so that the field directly compensates for change in load. Thus, increased load causes increased field, and in turn compensating increased voltage. Since the field requires direct current, it has been proposed to use a current transformer, the primary being in the armature circuit, and the secondary driving the field through a rectifier system.

In this organization, a regulator might yet be used, but only to correct for power factor deviations. Of course, its size would be reduced, and its design would be simplified.

Even this current transformer arrangement is far from ideal, and for two reasons. First, a current transformer is inherently dangerous. An accidentally open-circuit can create a dangerous high voltage. Second, since induction coils are involved, there is still an element of delay in having the field follow changing load conditions.

The primary object of this invention is to overcome the foregoing disadvantages by avoiding the use of a current transformer. For this purpose, the armature winding is actually opened and the compensating field winding is directly inserted by the aid of a rectifier network.

This invention possesses many other advantages and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGS. 1, 2, 3 and 4 diagrammatically illustrate armature circuits for four forms of the present invention.

In the form illustrated in FIG. 1, three-phase windings 10, 11 and 12 of a three-phase alternator are illustrated. The windings 10, 11 and 12, at corresponding first ends, provide output terminals 13, 14 and 15 for connection to a load (not shown). The other ends of the windings 10, 11 and 12, as at terminals 16, 17 and 18, instead of being connected together in customary star fashion are open for insertion of a compensating field generally designated at 20.

The compensating field 20 includes six field winding sections or coils 21, 22, 23, 24, 25 and 26, two for each phase of the alternator. These windings may, if desired, be concentrically located on the rotor structure.

The compensating field 20 provides three terminals 27, 28 and 29 respectively common to the terminals 16, 17 and 18 as by the aids of leads 30, 31 and 32.

Except for the load imposed by the coils 21, 22, 23, 24, 25 and 26, the terminals 27, 28 and 29 of the alternator phase windings all connect to a common or neutral connection 33. The star connection for the three-phase alternating current armature windings 10, 11 and 12 is accordingly completed. The connections are established by the use of a series of rectifiers 34, 35, 36, 37, 38 and 39 serially associated with the field winding sections 21 through 26 respectively.

Each of the terminals 27, 28 and 29 connects to the neutral connection 33 via two branches, each including a coil section and its associated rectifier. However, the rectifiers of the respective branches are opposite with respect to the neutral connection 33 or its phase terminals 27, 28 or 29. This ensures a conductive path between the phase terminals and the neutral connection whatever may be their relative polarity. Yet the current in each branch is unidirectional. Hence, the winding sections 21–26 provide the requisite constant polarity flux for operation of the alternator. The total flux varies only slightly. The winding sections of each pair 21–22, 23–24 and 25–26 are of the opposite hand to achieve the requisite field volarity.

The neutral connection 33 may be made exteriorly accessible as by a lead 40. A neutral terminal 41 is located adjacent alternator terminals 13, 14 and 15.

In operation, a change in load conditions at the terminals 13, 14 and 15 is immediately reflected in the field circuit and compensation is immediately achieved as in a series D.C. generator.

As shown in phantom lines in FIG. 1, there may be provided a shunt field, or an external or other field having the characteristics of a shunt field. A desirable relationship is one in which the shunt field provides the no load excitation and the series or compensating field provides the difference between no load excitation and the load excitation. A regulator, indicated by the arrow, may be provided to control the shunt field. If the series field is appropriately calibrated, the voltage regulator need only compensate for power factor changes. Correspondingly, if no power factor change occurs, a regulator need not be provided.

Figure 2:
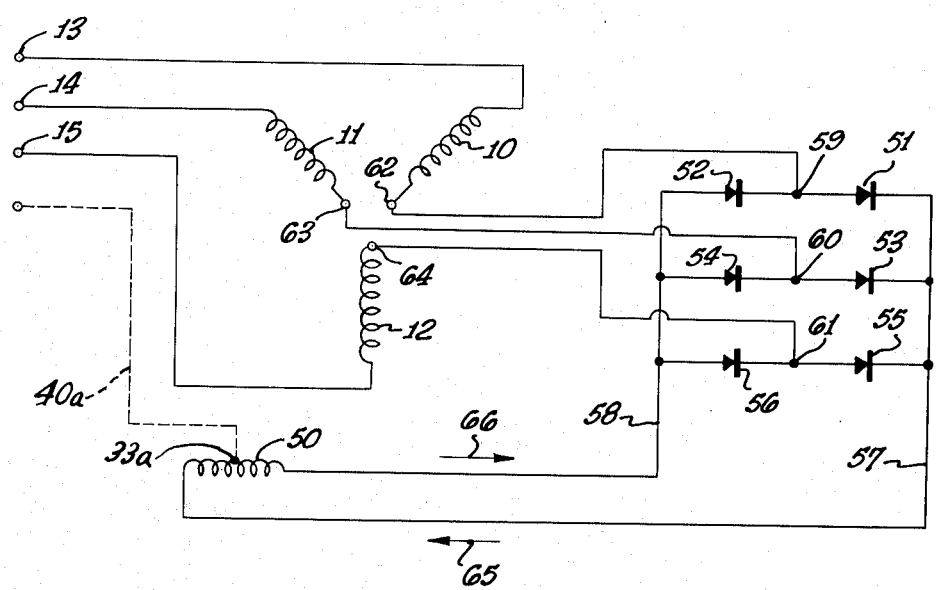

In the form illustrated in FIG. 2, an arrangement is provided whereby but a single winding 50 is provided that is serially associated with the alternator phase windings 10, 11 and 12. For this purpose six rectifiers 51, 52, 53, 54, 55 and 56 are provided. The field winding 50 is connected across leads 57 and 58. Rectifiers in serial pairs each connect across the leads 57 and 58. Thus, serially joined rectifiers 51 and 52 connect across the leads 57 and 58 as do serially joined rectifiers 53–54 and 55–56. The rectifiers are polarized for unidirectional current flow between the leads 57 and 58.

The junctions between the rectifiers of each pair, as at 59, 60 and 61, connect respectively to the inner star terminals 62, 63 and 64 of the respective phase windings 10, 11 and 12 of the armature. Any phase terminal 59, 60 or 61 is thereby connected to the phase terminals 60, 61 or 59, or 61, 59 or 60, via the field coil 50 and the rectifier network. Thus, for example, a circuit in the direction of current flow indicated by the arrows 65 and 66 may be traced from the terminal 59 to the terminals 60 or 61 as follows: rectifier 51, lead 57, field coil 50, lead 58, rectifier 54 to the terminal 60 or rectifier 56 to terminal 61. Circuits can simularly be traced from the other terminals 60 and 61 to terminals 59, 61 or 59, 60. The phase terminals 62, 63 and 64 are accordingly interconnected via the coil or winding 50. The arrangement of rectifiers ensures appropriate flow of alternating current for the multiphase armature structure and at the same time ensures unidirectional flow through the field coil 50. The coil 50 has an intermediate terminal 33a to which a lead 40a may be connected.

Figure 3:
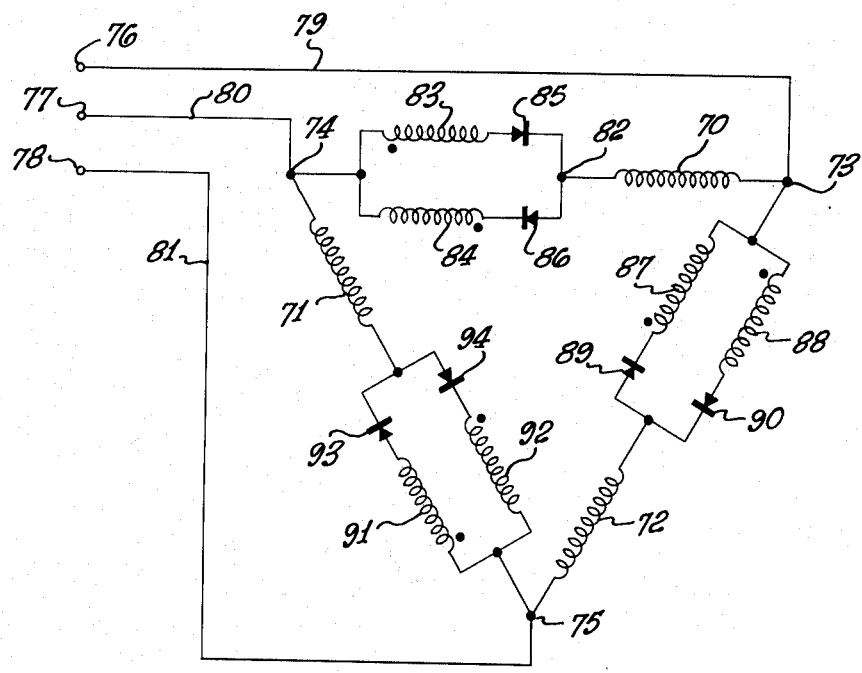

In the form illustrated in FIG. 3, the armature winding sections 70, 71 and 72 are connected in mesh among terminals 73, 74 and 75 that are respectively associated with output terminals 76, 77 and 78 via leads 79, 80 and 81. In each of the delta or mesh branches two field winding sections are inserted. Thus, for example, one end of the phase winding 70 is connected to the mesh terminal 73. The other end of the phase winding section 70 provides an intermediate terminal 82. Between this intermediate terminal 82 and another mesh terminal 74, each of the field winding sections 83 and 84 is connected. Serially associated with winding sections 83 and 84 are oppositely polarized rectifiers 85 and 86. Whatever the relative polarity of the intermediate terminal 82 and mesh terminal 74, a conductive path is provided. At the same time, the field coil sections pass current in one direction only. The windings of each pair 83–84, 87–88 and 91–92 are of the opposite hand to achieve the requisite field polarity.

Field winding sections 87 and 88 together with serially associated oppositely polarized rectifiers 89 and 90 are provided for the delta or mesh branch associated with the phase winding 72, and field winding sections 91 and 92 together with serially associated oppositely polarized rectifiers 93 and 94, are correspondingly provided for the delta or mesh branch associated with the phase winding section 71.

Figure 4:
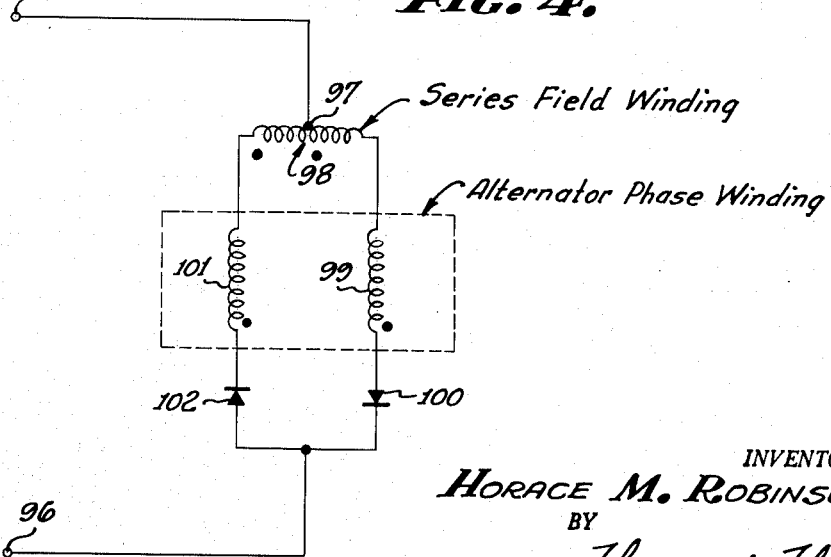

In FIG. 4, an alternator circuit is shown that provides two output terminals 95 and 96. The circuit comprises two identical but opposite polarized parallel branches. The branches extend from a central terminal 97 of a series field winding 98 so that one half of the field winding 98 is in each branch. An alternator phase winding section 99 and a rectifier 100 complete one branch, and another alternator phase winding section 101 and a rectifier 102 complete the other branch.

The circuit illustrated in FIG. 4 may be used for single phase operation, or several such circuits may be arrayed in star or mesh to provide a multiphase operation, as in the forms shown in FIGS. 1 to 3.

The inventor claims:

1. In combination: an alternator having a plurality of phase windings each having at one end an alternating current output terminal adapted to connect a load, and another terminal at the other end; a field winding means for the alternator; and a full wave rectifier network having input terminals connected to the said other terminals of the phase windings; said full wave rectifier network connecting the said other terminals together, but only via said field winding means.

2. In combination: an alternator having a pluarlity of phase windings; a pair of parallel connected field winding sections for each phase winding, and serially connected thereto; and a unidirectionally conductive means in each branch of the parallel connected field winding sections, and of opposite polarity to provide conduction in both directions via alternate branches.

3. In combination: an alternator having a plurality of phase windings each having at one end an alternating current output terminal adapted to connect to a load, and another terminal at the other end; a field winding for the alternator and having two terminals; a pluarlity of pairs of serially connected unidirectionally conductive devices, each pair of devices being connected between the field winding terminals, and of polarity to determine unidirectional conduction through the field winding; and means connecting the junctions between devices for the pairs respectively to the said other terminals.

4. In combination: an alternator having a plurality of phase windings having first corresponding terminals adapted to connect to a load, and second corresponding terminals; a neutral connection; a pair of parallel connected field winding sections for each phase winding serially connecting the said neutral connection to the said second terminal of the corresponding phase winding; and a unidirectionally conductive device for each branch of the parallel connected field winding sections and of opposite polarity to provide conduction in both directions via alternate branches.

5. In combination: an alternator having a plurality of phase windings and a plurality of output terminals; a pair of parallel connected field winding sections for each phase winding and serially connected thereto; a unidirectionally conductive device for each branch of the parallel connected field winding sections and of opposite polarity to provide conduction in both directions via alternate branches; and means mesh connecting the phase windings together with their associated parallel connected field winding sections to the output terminals.

6. In combination: an alternator having a plurality of phase windings having alternating current output terminals; and field winding means for the alternator serially connected to the phase windings so that the load current passes directly through the field winding means.

7. In combination: an alternator having a phase winding; a pair of parallel connected field winding sections for the phase winding, and serially connected thereto; and a unidirectionally conductive means in each branch of the parallel connected field winding sections, and of opposite polarity to provide conduction in both directions via alternate branches.

8. In combination: an alternator having a phase winding having a terminal adapted to connect to a load, and a second terminal; a field winding for the alternator and having two terminals; a pair of serially connected unidirectionally conductive devices connected across the two terminals of the field winding, the devices being of corresponding polarity to determine unidirectional conduction through the field winding; means connecting the junction between the devices to the second terminal of the phase winding; and means forming a second load terminal from a neutral point of said field winding.

9. In an alternator: an alternator phase winding having two branches parallel connected; a unidirectionally conductive device and a field winding section serially inserted in each branch; the unidirectionally conductive devices being of opposite polarity for passage of alternating current between terminals of the parallel connected branches.

10. In combination: an alternator having a plurality of phase windings each having at one end an alternating current output terminal adapted to connect to a load, and another terminal at the other end; a field winding for the alternator and having two end terminals and an intermediate terminal; a plurality of pairs of serially connected unidirectionally conductive devices, each pair of devices being connected across the field winding end terminals, and of polarity to determine unidirectional conduction through the field winding; means connecting the junctions between devices of the pairs respectively to the said other terminals; and a connection at the intermediate terminal of the field winding.

11. In an alternator: a phase winding for the alternator; a non-serial field winding; a compensating series field winding; unidirectionally conductive means; means forming alternating current output terminals for connection to a load; an alternating current load connected across said terminals; means connecting the phase winding, the compensating field winding and the unidirectionally conductive means across the terminals to establish a serial relationship of said phase winding, field winding and unidirectionally conductive means with respect to said output terminals so that components of the alternating current at the terminals pass through at least portions of the series field winding; said series field winding being energized solely by the load current.

12. In an alternator: a phase winding; a non-serial field winding; a compensating series field winding for the alternator; means forming alternating current output terminals; an alternating current load connected across said terminals; and a full wave rectifier network serially connecting the field winding and the phase winding with respect to the output terminals so that the load current drawn from said output terminals passes directly through the series field winding, said series field winding being energized solely by the load current.

13. In combination: an alternator phase winding; a non-serial field winding; means forming alternating current output terminals; an alternating current load connected across said terminals; load compensating field winding means for the alternator; unidirectionally conductive means establishing a serial relationship between the compensating field winding means and the phase winding with respect to said output terminals, said series field winding being energized solely by the load current.

References Cited by the Examiner

UNITED STATES PATENTS

| | | | |
|---|---|---|---|
| 1,946,303 | 2/34 | Brown | 322—67 |
| 2,454,581 | 11/48 | Thomas | 322—63 |
| 2,519,650 | 8/50 | Hamilton | 322—25 |
| 2,836,786 | 5/58 | Scharstein et al. | 322—25 |
| 3,017,562 | 1/62 | Duane | 322—63 |
| 3,031,607 | 4/62 | Rona | 322—25 |
| 3,034,035 | 5/62 | Baumann et al. | 322—28 |
| 3,042,850 | 7/62 | Kern | 322—79 |

LLOYD McCOLLUM, *Primary Examiner.*

MILTON O. HIRSHFIELD, *Examiner.*